United States Patent [19]
Kuo

[11] Patent Number: 4,759,645
[45] Date of Patent: Jul. 26, 1988

[54] BEARING BASE STRUCTURE FOR A FOLDABLE HEX-KEY WRENCH SET

[76] Inventor: Teng-Tang Kuo, 7 Kung Yuang Rd., Hsi Chih, Taipei Hsien, Taiwan

[21] Appl. No.: 50,481

[22] Filed: May 18, 1987

[51] Int. Cl.⁴ .............................................. F16C 17/10
[52] U.S. Cl. ................................................... 384/396
[58] Field of Search ............... 384/420, 424, 396, 441, 384/425, 426

[56] References Cited

U.S. PATENT DOCUMENTS

| | | | |
|---|---|---|---|
| 1,378,798 | 5/1921 | Kroh | 384/396 |
| 1,494,660 | 5/1924 | Brandstetter | 384/396 |
| 3,964,799 | 6/1976 | Knapp | 384/441 |

Primary Examiner—Lenard A. Footland
Attorney, Agent, or Firm—Wenderoth, Lind & Ponack

[57] ABSTRACT

An improved structure of the bearing base for a foldable hex-key wrench set. The both ends of the bearing base are mounted with several hex-key wrenches respectively. The bearing base comprises two bearing plates formed into L-shaped members. The two bearing plates may be set, with bolts, at different widths by means of bolts having different lengths so as to mount on the bolts a different number of wrenches; therefore, one bearing base can accomodate different wrench set having different number of hex-key wrenches.

4 Claims, 2 Drawing Sheets

BEARING BASE STRUCTURE FOR A FOLDABLE HEX-KEY WRENCH SET

FIELD OF THE INVENTION

This invention provides an improved bearing base structure for a foldable hex-key wrench set; the bearing base comprises two bearing plates, each of which looks like a L-shaped member from a longitudinal sectional view. The spacer between the two bearing plates may be varied by using two bolts having a given length so as to mount several different wrenches with a suitable space among the hex-key wrenches.

DESCRIPTION OF THE PRIOR ART

There is a current foldable hex-key wrench set, which has a fixedly sized bearing base, and the both ends of its bearing base are mounted with several hex-key wrenches. The cross sectional view of the bearing base looks like a "U". One end of each of the hex-key wrenches is formed into a round hook; a bolt mounted at each end of the bearing base is mounted with several hex-key wrenches through the round hooks thereof. The conventional foldable hex-key wrench set comprises several hex-key wrenches held together without the chance of loss and being convenient to carry by the user; however, its drawback is that the bearing base has a fixed form and width; i.e., only a limited number of hex-key wrenches can be mounted therein. In case of a user or a company requiring more hex-key wrenches in different size, the manufacturer has to make various kinds of bearing bases to meet the requirements; i.e., more molds have to be provided; such means an increase in manufacturing costs.

SUMMARY OF THE INVENTION

The prime object of the present invention is to provide an improved bearing base structure for a foldable hex-key wrench set. The improvement is to change the fixed type of bearing base into two opposite bearing plates, each of which is formed into a L-shaped member in the longitudinal cross sectional view; the two bearing plates are mounted together with two bolts at the both ends thereof. The space between the two bearing plates can be varied by using two bolts having a suitable length; in other words, one type of bearing base can be used for assembling several types of wrench sets having different widths and having different number of hex-key wrenches so as to meet various user's requirements; therefore, the present invention can reduce the manufacturing cost.

Another object of the present invention is to provide an improved bearing base for a foldable hex-key wrench set; each of the two bearing plates is formed into a L-shaped member in longitudinal cross sectional view. The engaging bottom edges of the two bearing plates may be formed into any type of opposite curves for esthetic purpose.

DETAILED DESCRIPTION

Figure 1:
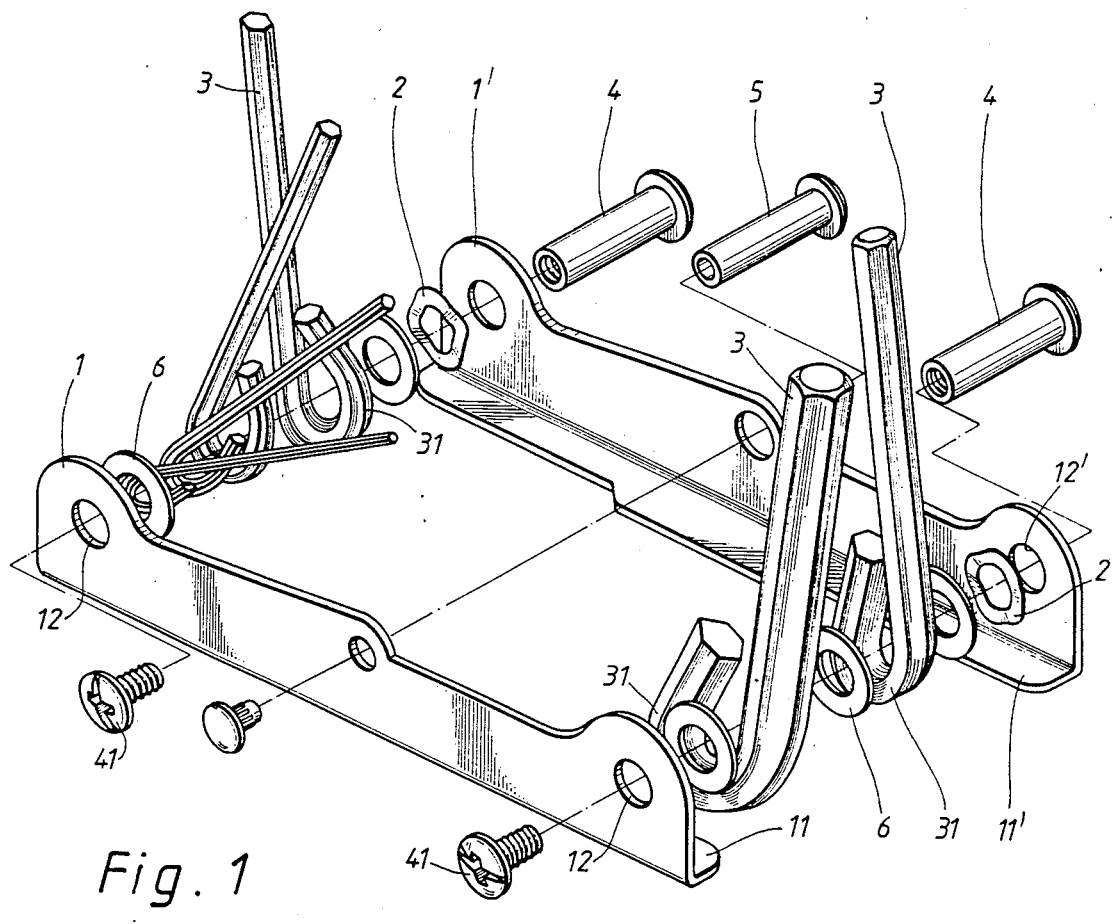
FIG. 1 is a disassembled and perspective view of the foldable hex-key wrench set according to the present invention.
Figure 2:
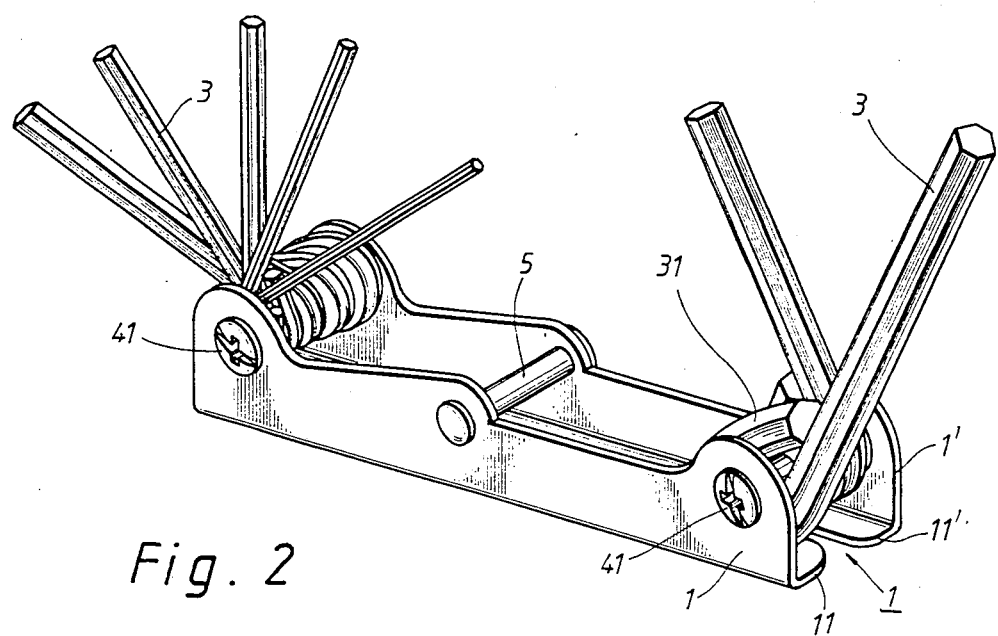
FIG. 2 is an assembled and perspective view of the present invention.
Figure 3:
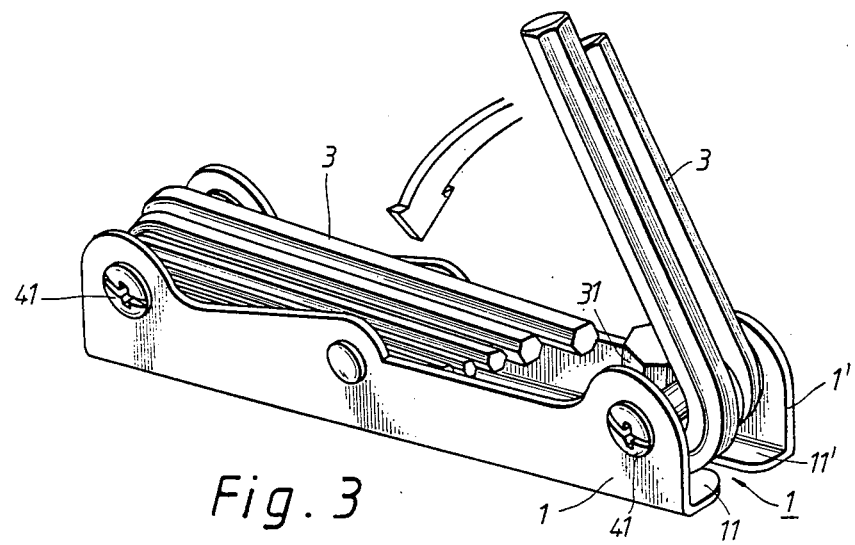
FIG. 3 is a perspective view of the present invention, being folded into the bearing base.
Figure 4:
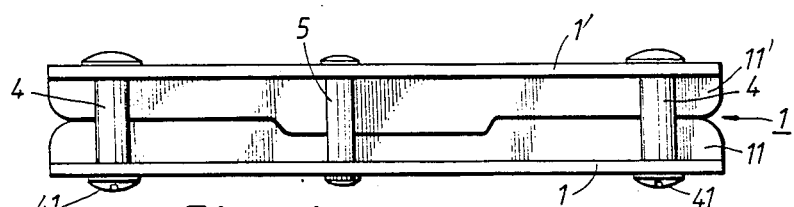
FIG. 4 is a top view of the bearing base according to the present invention, being assembled with short bolts.
Figure 5:
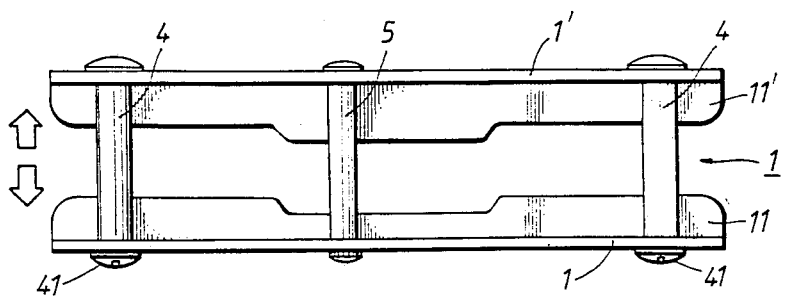
FIG. 5 is a top view of the bearing base according to the present invention, being assembled with long bolts.

Referring to FIG. 1, the hex-key wrench set according to the present invention mainly comprises a left bearing plate 1, a right bearing plate 1', several spring washers 2, a set of hex-key wrenches 3, and several bolts 4. Each of the two bearing plates 1 and 1' is formed into a L-shaped member; the bottom portions 11 and 11' of the two bearing plates can be engaged each other by means of a suitable dividing curve so as to have the two bearing plates 1 and 1' formed into a U-channel-shaped bearing base 1. Each end of the bearing base 1 is mounted with a bolt 4, on which several hex-key wrenches 3 are pivotally mounted; at one end of the bolt 4, there is a spring washer 2 mounted beside the hex-key wrenches 3. After the bolt 4 and screw 41 are fitted in place, the spring washer 2 elastically holds the wrenches in place under a suitable force so as to facilitate each of the wrenches being turned at the angle desired as shown in FIGS. 2 and 3. The left and right bearing plates 1 and 1' can be separated or combined together by means of the bolts 4 and screws 41; the hook portions 31 of the hex-key wrenches 3 are mounted around the bolts 4 to form the fulcrum therefor. The width of the bearing base 1 is dependent upon the number of wrenches 3 to be mounted and the length of the bolts 4 as shown in FIGS. 4 and 5. Given that the width of the bearing base 1 can be varied, the manufacturing cost thereof can be reduced because of the bearing base being made with only one mold.

In the middle portion of the bearing base 1, a bracing rod 5 is mounted as a wrench rest when all wrenches are folded up for the convenience of carrying or storage. Each of the wrenches can be picked up separately and turned out for operation.

The width of both ends of the bearing base 1 formed with the two bearing plated 1 and 1' can be adjusted equally by increasing the given number of plate washers 6; however, that is not included in the features of the present invention.

Briefly, the bearing base 1 is simply made of two bearing plates 1 and 1'. The width of the bearing base 1 may be varied by using the bolts 4 of a suitable length; then, a different given number of wrenches can be mounted in the bearing base to meet the requirements of different users; i.e., one bearing base can be used for assembly into different hex-key wrench sets. The engaging edges between the two bearing plates 1 and 1' may be designed into different types of curves for variety and beauty.

I claim:

1. A bearing base structure for a foldable hex-key set comprising left and right bearing plates in spaced opposed relation, each said bearing plate having a plurality of apertures therein, each aperture of said plurality of apertures in said left bearing plate being substantially aligned with a respective aperture in said right bearing plate;

first bolts means for rotatable supporting hex-keys and for supporting spring washers and flat washers thereon, said bolt means being inserted through outermost substantially aligned apertures of said plurality of apertures in said left and right bearing plates, and detachable retaining said left and right bearing plates in spaced opposed relation;

second bolt means for supporting the free end of a hex-key resting thereon, said bolt means being inserted through substantially aligned inward apertures of said plurality of apertures in said left and right bearing plates, said inward apertures being disposed inwardly of said outermost apertures;

said left and right bearing plates each having upper and lower legs defining a substantially L-shaped cross section thereof, said plurality of apertures being in said upper legs, the left and right lower legs having the respective free ends thereof being inwardly directed, said respective free ends of said lower legs having free edges defining complimentary curves.

2. A bearing base structure as in claim 1, further comprising a third bolt means for rotatably supporting hex-keys, and for supporting spring washers and flat washers thereon, said third bolt means being inserted through opposite outermost substantially aligned apertures of said plurality of apertures in said left and right bearing plates, and detachably retaining said left and right bearing plates in spaced opposed relation.

3. A foldable hex-key wrench set comprising left and right bearing plates in spaced opposed relation, each said bearing plate having a plurality of apertures therein, each aperture of said plurality of apertures in said left bearing plate being substantially aligned with a respective aperture in said right bearing plate;

first bolt means for rotatable supporting hex-keys and for supporting spring washers and flat washers thereon, said bolt means being inserted through outermost substantially aligned apertures of said plurality of apertures in said left and right bearing plates, and detachable retaining said left and right bearing plates in spaced opposed relation;

second bolt means for supporting the free end of a hex-key resting thereon, said bolt means being inserted through substantially aligned inward apertures of said plurality of apertures in said left and right bearing plates, said inward apertures being disposed inwardly of said outermost apertures;

said left and right bearing plates each having upper and lower legs defining a substantially L-shaped cross section thereof, said plurality of apertures being in said upper legs, the left and right lower legs having the respective free ends thereof being inwardly directed, said respective free ends of said lower legs having free edges defining complimentary curves;

at least one hex-key rotatably supported on said first bolt means;

at least one spring washer and at least one flat washer supported on said first bolt means.

4. A foldable hex-key wrench set as in claim 3, further comprising a third bolt means for rotatably supporting hex-keys, and for supporting spring washers and flat washers thereon, said third bolt means being inserted through opposite outermost substantially aligned apertures of said plurality of apertures in said left and right bearing plates, and detachably retaining said left and right bearing plates in spaced opposed relation;

at least one hex-key rotatably supported on said third bolt means;

at least one spring washer and at least one flat washer supported on said third bolt means.

* * * * *